United States Patent
Layman et al.

(10) Patent No.: US 7,149,965 B1
(45) Date of Patent: Dec. 12, 2006

(54) OBJECT PERSISTER

(75) Inventors: Andrew J. Layman, Bellevue, WA (US); Gopal Krishna R. Kakivaya, Sammamish, WA (US); Satish R. Thatte, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 09/635,830

(22) Filed: Aug. 9, 2000

Related U.S. Application Data

(60) Provisional application No. 60/148,172, filed on Aug. 10, 1999.

(51) Int. Cl.
*G06F 15/00* (2006.01)

(52) U.S. Cl. .................... 715/513; 715/500; 715/500.1

(58) Field of Classification Search ............. 715/501.1, 715/513, 500, 500.1; 707/103 R, 3; 709/203
See application file for complete search history.

(56) References Cited

U.S. PATENT DOCUMENTS 6,671,853 B1   12/2003   Burkett et al.
6,704,743 B1*  3/2004    Martin .................. 707/103 R
6,772,216 B1*  8/2004    Ankireddipally et al. ... 709/230
6,874,146 B1   3/2005    Iyengar
2002/0156772 A1* 10/2002  Chau et al. ..................... 707/3
2003/0074634 A1  4/2003   Emmelmann

OTHER PUBLICATIONS

Martin et al. (hereinafter Martin) "Professional XML", Public Release □□Jan. 2000, By Wrox Press Ltd, Birmingham-UK□□pp. 70-79, 106-127 and 498-511.*

* cited by examiner

*Primary Examiner*—William Bashore
*Assistant Examiner*—Quoc A. Tran
(74) *Attorney, Agent, or Firm*—Lee & Hayes, PLLC

(57) ABSTRACT

The object persister serializes an object to preserve the object's data structure and its current data. The serialized object is encoded using XML and inserted within a message. That message is transmitted to an entity over a network. Such a transmission is performed using standard Internet protocols, such as HTML. Upon receiving the serialized object, the receiving entity deserializes the object to use it. Rather than include copies of referenced objects within the serialized object, the object persister includes references to those objects. This avoids redundant inclusion of the same object and potentially infinite inclusion of the object itself that is being serialized.

18 Claims, 4 Drawing Sheets

```
Struct Object_label
                    ← 32
{
    string param1_label  ⎫
    string param2_label  ⎬ Parameters
    int param3_label     ⎭   ← 34

ObjectName *memorylocation
                             ← 36
    Struct DataStruct_label  ⎫
    {                        ⎪
        int paramA_label     ⎬ Data Structure
        float paramB_label   ⎪ Parameter
        string paramC_label  ⎭   ← 38
    }
}
```

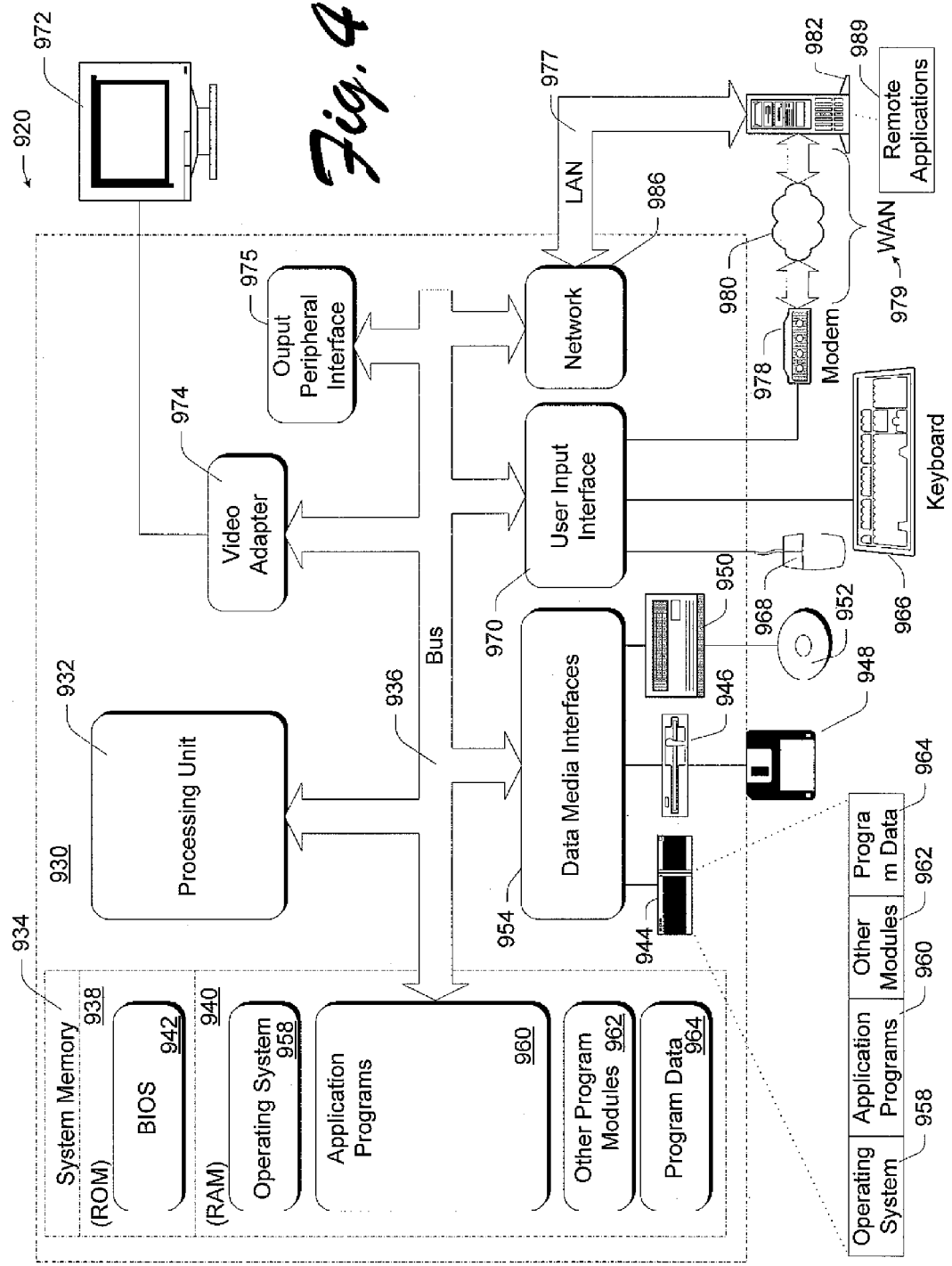

OBJECT PERSISTER

RELATED APPLICATIONS

This application claims the benefit of priority to U.S. Provisional Patent Application Ser. No. 60/148,172, filed on Aug. 10, 1999.

TECHNICAL FIELD

This invention relates the preservation of objects for later recovery and use.

BACKGROUND

Storing an object for later use by an application is called "object persistence." In addition, encoding an object for transmission over a distributed network is called object persistence. Object persistence is also known as "serializing an object." An "object" is the core concept of an "object-oriented paradigm.

Object-Oriented Paradigm

A large segment of the computing realm operates under the object-oriented paradigm. This is sometime called "object technology" or "object-oriented programming." In general, an object is understood to encapsulate data and procedures (i.e., methods).

Object-oriented programming is a type of programming in which programmers define not only the data type of a data structure, but also the types of operations (i.e., procedures, functions, or methods) that can be applied to the data structure. In this way, the data structure becomes an object that includes both data and functions. In addition, programmers can create relationships between one object and another. For example, objects can inherit characteristics from other objects.

One of the principal advantages of object-oriented programming techniques over procedural programming techniques is that they enable programmers to create modules that do not need to be changed when a new type of object is added. A programmer can simply create a new object that inherits many of its features from existing objects. This makes object-oriented programs easier to modify.

To perform object-oriented programming, one needs an object-oriented programming language (OOPL). "Java," "C++," and "Smalltalk" are three of the more popular languages, and there are object-oriented versions of Pascal.

The object-oriented paradigm allows for the fast development of applications to solve real problems. Using this paradigm, applications can interact with other applications (or the operating system) on the same computer. Such an interaction may involve sharing data or requesting execution of a task by another application. For example, the Component Object Model (COM), by the Microsoft Corporation, enables programmers to develop objects that can be accessed by any COM-compliant application on the same computer.

The object-oriented paradigm also allows applications to interact with applications on different computers. This is often called "distributed computing."

Generally, distributed computing utilizes different components and objects comprising an application that are located on different computers coupled to a network. So, for example, a word processing application might consist of an editor component on one computer, a spell-checker object on a second computer, and a thesaurus on a third computer. In some distributed computing systems, each of the three computers could even be running a different operating system.

One of the requirements of distributed computing is a set of standards that specify how objects communicate with one another. There are currently two chief distributed computing standards: CORBA (Common Object Request Broker Architecture) and DCOM (Distributed Component Object Model).

For example, programmers may use DCOM (by the Microsoft Corporation) to develop objects that can be accessed by any DCOM-compliant application on a different computer. DCOM is an extension of COM to support objects distributed across a network.

Object Serialization

Serialization is the process of saving and restoring objects. More precisely, serialization is the process of saving and restoring the current data and the data structures of objects. The information is extracted from objects so that it is not lost or destroyed. In other words, the transitory status of objects is fixed (often in a file or a database) for the purpose of storage or communications. This process is also called "object persistence."

If an application using an object is closed, then the object's data and its data structures must be preserved so that the object may be restored into its current state when the program is invoked again. For example, it is often necessary to temporarily store an object so that another application may access it. In another example, sending an object to another computer in a distributed computing environment requires the object be stored, transmitted, received, and recovered. In each of these examples, objects are stored and restored.

When serializing an object, the focus is not so much on how to store an object's data in non-volatile memory (such as a hard drive), but rather on how the in-memory data structure of an object differs from how the data appears once it has been extracted from the object. In memory, the data is located at arbitrary addresses, which are conceptually defined as data structures including data, arrays, objects, methods, and the like. However, these data structures cannot be stored directly.

To store a data structure, it must be broken down into its component parts, which includes simple data types like integers, strings, floating point numbers, etc. In addition, the hierarchical arrangement within each data structure must be stored and maintained. Furthermore, the hierarchical arrangement of data structures themselves must be stored and maintained.

The serialized data of an object may be thought of as a "dehydrated object" where all of the water (object functions in this metaphor) has been squeezed out of the object. This leaves only dry potato flakes (the data). Later, a hungry person 11 wishes to have mashed potatoes (the object with the data), the potato flakes may be rehydrated. To "add water" to a dehydrated object, an empty object is created and the stored data is inserted therein.

Serialization of an object is an effective and important step in exchanging the object between computers. These types of object exchanges are important to a distributed computing environment where computers actively distribute objects across a network. Those of ordinary skill in the art are familiar with object serialization.

Serialization Issues

Separating Data Items: When serializing an object, data items must be separated from each other when they are stored. Otherwise, they will not be properly identified later when reading the data back into a new object during deserialization. Therefore, a serialization scheme must specify how data items are separated from each other.

Preserving Hierarchical Structure: Unless the hierarchical structure of the data is preserved during the serialization process, it cannot be recreated during a deserialization. Each data structure is potentially different from each other.

Therefore, a serialization scheme must have a general data format suiting the needs of all potential data structures of an object. Typically, such a scheme accomplishes this by having the capability to delimit arbitrary nested data, that is, truly hierarchical data structures.

Preserving Object Relationships: Often objects include references to other objects. When in memory, this reference is often a pointer in memory to the other objects. When serializing an object with a reference to another object, the serialized object includes the entire object like its does for a data structure.

However, if there are multiple references to the same object, then there are redundant inclusions of the same object. Furthermore, if the reference within an object is to itself (directly or indirectly), then the serialization process may fall because it is circularly and potentially infinitely storing object data.

Extensible Markup Language (XML)

SGML (Standard Generalized Markup Language) is a generic text formatting language that is widely used for large databases and multiple media projects. It is particularly well suited for works involving intensive cross-referencing and indexing.

HTML (HyperText Markup Language) is a specific implementation of a subset of SGML and is nearly universally used throughout the global as the foundation for the World Wide Web ("Web). HTML uses tags to mark elements, such as text and graphics, in a document to indicate how Web browsers should display these elements to the user. HTML tags also indicate how the Web browsers should respond to user actions such as activation of a link by means of a key press or mouse click.

XML (eXtensible Markup Language) is a specific implementation of a condensed form of SGML. XML lets Web developers and designers create customized tags that offer greater flexibility in organizing and presenting information than is possible with the HTML document coding system.

In HTML, both the tag semantics and the tag set are fixed. XML specifies neither semantics nor a tag set. In fact, XML is really a meta-language for describing markup languages. In other words, XML provides a facility to define tags and the structural relationships between them. Since there's no predefined tag set, there are no preconceived semantics. All of the semantics of an XML document will be defined either by the applications that process them or by stylesheets.

As the Internet becomes a serious business tool, HTML's limitations are becoming more apparent. For example, HTML can be used to exchange data, but it is not capable of exchanging objects. To be more precise, HTML cannot be used to exchange serialized objects.

XML does not have defined protocol for exchanging serialized objects between computers within a distributed computing environment.

SUMMARY

The object persister serializes an object to preserve the object's data structure and its current data. The serialized object is encoded using XML and inserted within a message. That message is transmitted to an entity over a network. Such a transmission is performed using standard Internet protocols, such as HTML. Upon receiving the serialized object, the receiving entity deserializes the object to use it.

Rather than include copies of referenced objects within the serialized object, the object persister includes references to those objects. This avoids redundant inclusion of the same object and potentially infinite inclusion of the object itself that is being serialized.

BRIEF DESCRIPTION OF THE DRAWINGS

FIG. 4 is an example of a computer capable of implementing the exemplary object persister.

DETAILED DESCRIPTION

The following description sets forth a specific embodiment of the object persister that incorporates elements recited in the appended claims. This embodiment is described with specificity in order to meet statutory written description, enablement, and best-mode requirements. However, the description itself is not intended to limit the scope of this patent. Rather, the inventors have contemplated that the claimed object persister might also be embodied in other ways, in conjunction with other present or future technologies.

Computer Entities and Object Exchange

Figures 1, 2A:
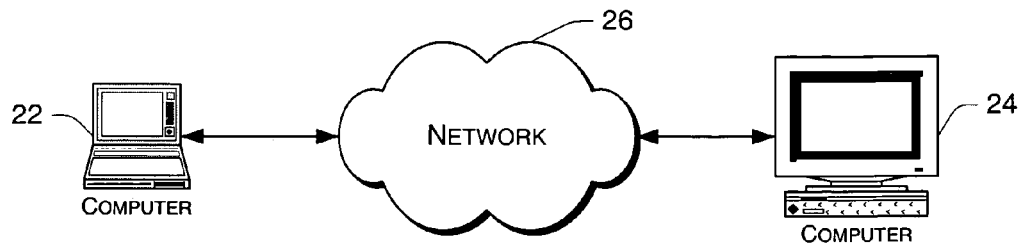
FIG. 1 is a schematic illustration of an exemplary computer network (such as the Internet) that includes two computer entities.
FIG. 2a is a textual illustration of a typical data structure of an object as represented in pseudocode.

FIG. 1 shows two computers 22, 24. These computers are connected to each other via a computer network 26. These computers may be desktop, laptop, handheld, server, or mainframe computers. These computers may be a computer capable of connecting to a communications network and exchanging messages. More particularly, a message comprises at least one serialized object. The network 26 may be a private network (e.g., a local or wide area network) or a public network (e.g., the Internet).

Herein, an entity is understood to be a computer component that is capable of exchanging messages containing at least one serialized object with another entity. Such an entity may be in an object-oriented, decentralized, distributed network environment. Alternatively, such an entity may be in a local, object-oriented computing environment. For example, an entity may be a computer, a computer system, a component of a computer, or an application running on a computer.

Herein, an originating entity (i.e., originator) is an entity that serialized an object, inserts it into a message, and sends that message. A destination entity (i.e., ultimate destination) is an entity that receives the message, parses the message, and deserializes the serialized object in the message. The exemplary object persister is implemented by one or more computer entities within a local computing environment or within a distributed network environment.

SOAP

In the primary exemplary embodiment described herein, the object persister is implemented as part of a protocol called Simple Object Access Protocol 11 (SOAP). In addition, the primary exemplary embodiment described herein employs XML (eXtensible Markup Language).

SOAP provides a simple and lightweight mechanism for exchanging structured and typed information between peers in a decentralized, distributed environment using XML. SOAP does not itself define any application semantics such as a programming model or implementation specific semantics; rather it defines a simple mechanism for expressing application semantics by providing a modular packaging model and an encoding mechanism for encoding data within modules. This allows SOAP to be used in a large variety of systems ranging from general messaging systems to object-oriented programming systems to Remote Procedure Calls (RPC).

SOAP consists of two parts:

The SOAP envelope construct defines an overall framework for expressing what is in a message; who should deal with it, and whether it is optional or mandatory.

The SOAP encoding mechanism defines a serialization mechanism for exchange of application-defined datatypes.

The SOAP envelope portion (which may be called the "message exchanger") is described in more detail in appendix A and in co-pending patent application, entitled "Messaging Method, Apparatus, and Article of Manufacture", which was filed Apr. 27, 2000 and is assigned to the Microsoft Corporation. The co-pending application is incorporated by reference.

The SOAP encoding mechanism includes the primarily exemplary embodiment of an object persister described herein. Furthermore, SOAP is described in more detail in Appendix A.

XML and HTTP

Unlike HTML (HyperText Markup Language), XML has sufficient flexibility so that it is possible to exchange serialized objects over a network. XML has no standard mechanism to accomplish this. However, the exemplary object persister provides such a mechanism to accomplish this.

Using the exemplary object persister, an object is serialized and encoded into XML and sent over a network to a destination entity. With the exemplary 19 object persister, the serialized object is inserted into a message and sent over a network using HTTP (HyperText Transport Protocol). However, other transport protocols may be employed.

Serialization Format

The elements in the serialization format of the exemplary object persister represent different elements in an object data structure. The format is easily readable by humans and machines. The format also compensates for potentially infinite cycles where objects call each other.

In FIG. 2*a*, a data structure 30 of an exemplary object is shown. This is only an example and those of ordinary skill in the art will understand that an object can have nearly an infinite number of arrangements and labels. Data structure 30 is merely an example of one possible arrangement and labels. The object is called "Object_label" at 32. The data structure includes various parameters such as those shown at 34, 36, and 38.

A parameter may be one of many "datatypes" or "types". Datatype is a concept understood by those of ordinary skill in the art. There are two main forms of datatypes: simple and complex.

A parameter is a simple datatype when it is defined to be a most fundamental type of data. In other words, a simple datatype cannot be broken down into one or more simpler types. Examples of a simple data type include character, string, integer, and floating point.

A parameter is a complex datatype when it composed of one or more other datatypes, which may include simple and other complex datatypes. A complex datatype may also be a customized datatype, which is defined within the object or by a reference to a definition outside of the object.

In FIG. 2*a*, parameters 34 are simple datatypes. Param1_label and param2 are strings. Param3_label is an integer. Parameter 36 defines the name of another object called "ObjectName" and provides is memory address at "*memorylocation." This parameter includes another object within the data structure of the main object by naming it and providing its address.

The object's data structure also includes a parameter that is itself a data structure at 38. This data structure parameter defines additional parameters. In particular, the addition parameters include paramA_label (an integer), paramB_label (a floating point), and paramC_label (a string).

Figure 2B:
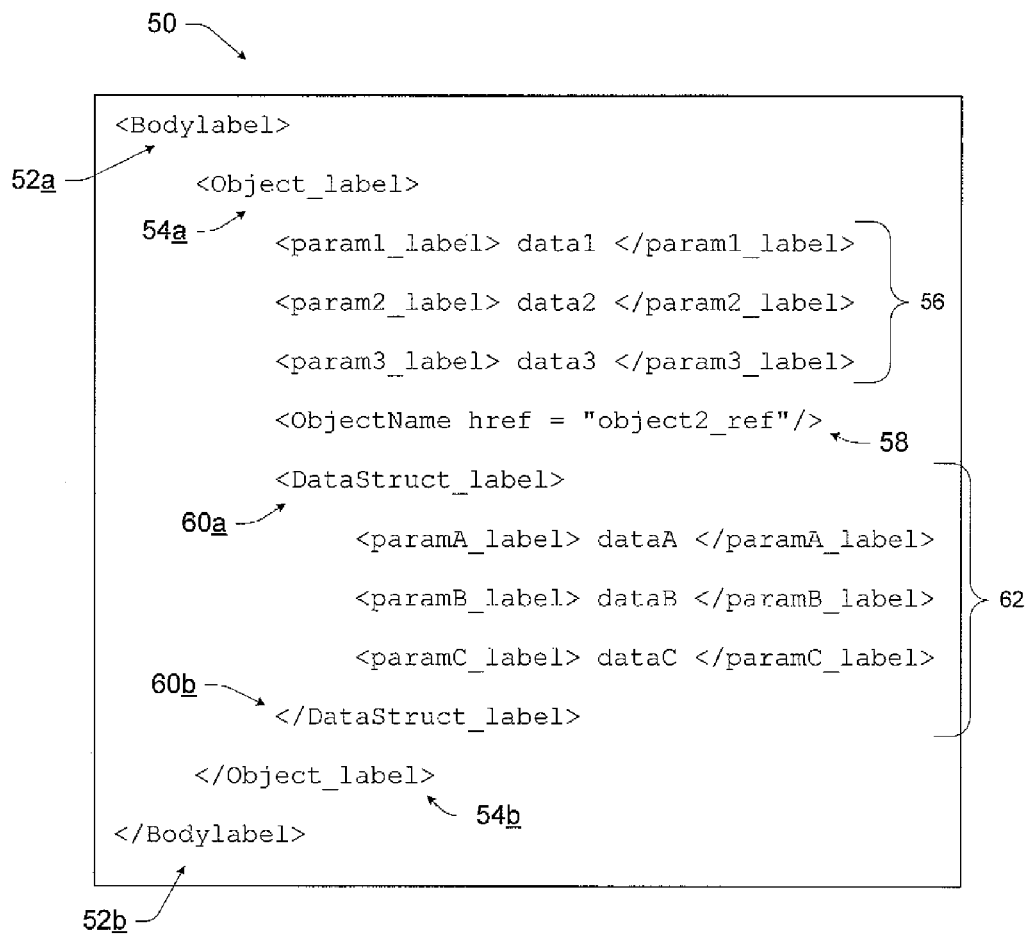
FIG. 2b is a textual illustration of a serialized object generated by an implementation of the exemplary object persister, where the typical data structure shown in FIG. 2a is the base object that was serialized.

FIG. 2*b* illustrates a serialized representation of the exemplary object shown in FIG. 2*a* that may be generated by the exemplary object persister. In addition to preserving the parameter labels and hieratical structure of the object in FIG. 2*a*, the exemplary object persister preserves the current "status" of the object at a moment in time. The "status" of the object is represented by the data actually stored within the data structure of the object at the moment that the object is serialized.

As discussed above (and shown in Appendix A), the serialized object of the exemplary object persister is sent within a message over a network. FIG. 2*b* shows the XML tags ("<Bodylabel>" and "<Bodylabel>") used to define the boundaries of the body of a message. The serialized object is typically inserted inside the body.

FIG. 2*b* shows the XML tags ("<Object_label>" at 54*a* and "<Object_label>" at 54*b*) that define the boundaries of the data structure of the serialized object (of FIG. 2*a*). Note that the same name "Object_label" is used in the label 32 of FIG. 2*a* and in the tags 54*a*, 54*b* of FIG. 2*b*.

Corresponding to the parameters 34 of FIG. 2*a* are serialized parameters 56 in FIG. 2*b*. Each parameter has a pair of tags that define the boundaries of the parameter. For example, "param2_label" has a beginning tag <param2_label> and an ending label <param2_label>. Between these tags is the serialized data of the parameter that was saved at the moment the object was serialized. For example, param3_label is an integer data type (see parameters 34 of FIG. 2*a*); therefore, data3 (in parameters 56 of FIG. 2*b*) may be any integer such as "43."

In FIG. 2*b*, none of the datatypes of the parameters is shown or defined. The datatypes may be defined internally or externally. Internal definition describes when datatype definitions for each parameter are specified within the message containing the serialized object. External definition describes when datatype definitions for each parameter are specified outside of the message, but the message contains one or more references to the location where the definitions are located.

FIG. 2*b* also shows a reference to another object at 58. In this parameter, an object called "ObjectName" is specified and it is located by a reference label "object2_ref". Rather than including a copy of the "ObjectName" object within the serialized object, the exemplary persister simply includes the reference to the object. Referencing of embedded objects instead of including them lessens the data that must be serialized and sent over a network.

The object being serialized may be quite large and include redundant information if it includes multiple references to another object or if a referenced object includes references to still other objects. Suppose, for example, an object being serialized includes references to ObjectA, ObjectB, ObjectC, ObjectD, and ObjectE. ObjectB includes references to ObjectD and ObjectE. In addition, ObjectE includes references to ObjectsA-D. If all referenced objects were included within the serialized object (as is conventional), then most of the referenced object would be included multiple times. This is redundant. The exemplary object persister avoids this problem by including references to an object rather than the object itself.

Furthermore, the serialization of an object may be stuck an infinite loop if the object includes a references to itself or if a referenced object refers back to the object being serialized. If the serialization process includes the referenced object within the serialized object (as is conventional), then the serialized object may include itself in itself in itself in itself in itself etc. The exemplary object persister avoids this problem by including references to an object rather than the object itself. Thus, an object will simply include a reference to itself.

In FIG. 2b, the serialized object also includes a parameter that is a data structure at 62. This data structure parameter is bounded by a pair of XML tags, "<DataStruct_label>" at 60a and "<DataStruct_label>" at 60b.

The serialized object bounded by tags 54a and 54b may also be called a data structure element or simply "datastruct" element. The tags are part of the datastruct element. Everything within these tags is content of the datastruct element. The parameters (such as 56, 58, and 62) are part of the contents of the datastruct element.

Serialization Example

Below is an example of serialization of an object. The exemplary object's data structure in pseudocode:

```
Struct StockQuote
{
    string    company;
    string    stocksymbol;
    int       annual_high;
    int       annual_low;
    int       current_price;
}
```

Below is a serialized representation of an object (based upon the above structure in pseudocode) generated in accordance with the exemplary object persister:
   <StockQuote>
     <company> CompanyX </company>
     <stocksymbol> CPYX </stocksymbol>
     <annual_high> 101 </annual_high>
     <annual_low> 72 </annual_low>
     <current_$_{price}$price> 93 </current_price>
   </StockQuote>

Exemplary Methodological Implementation of the Object Persister

Figure 3:
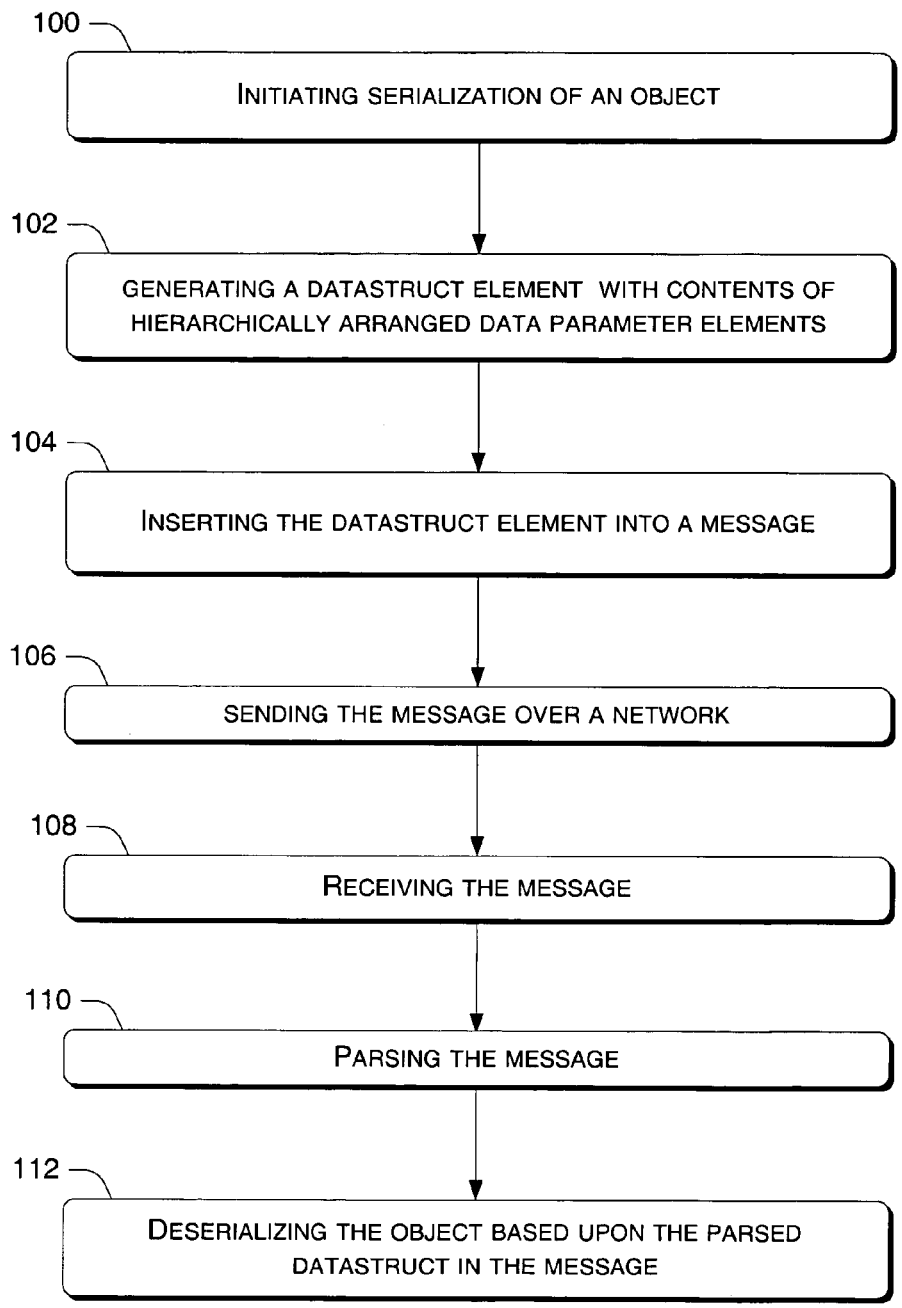
FIG. 3 is flowchart showing a process implementing the exemplary object persister.

FIG. 3 shows an exemplary methodological implementation of the object persister. At 100, the object serialization is initiated. This may be the result of a specific manual command or an automatic command of another program or object. If an object is being sent from an originating entity (such as entity 22 in FIG. 1) to a destination entity (such as entity 24 in FIG. 1), then the object must be serialized. Thus, serialization may be initiated by a request from the destination entity for the object.

At 102 of FIG. 3, the object is serialized in the manner generally described above in the Serialization Format section. More specifically, a datastruct element generated with contents. This datastruct element represents and preserves the hierarchical organization of the object data structure. The datastruct element is bounded by a pair of datastuct tags (such as tags 54a and 54b of FIG. 2b). The contents are inside the tags.

The contents of the data struct element include one or more data parameter elements (such as parameters 56, 58, and 62 in FIG. 2b). Each data parameter element represents and preserves the organization and label of the parameters of the object. Each parameter element is bounded by a pair of parameter tags (such as "<param2_label>" and "</param2_label>" of the first parameter in the parameters 56 in FIG. 2b). Between each pair of parameter tag is data that represents the value of that parameter when that object was serialized. The datatypes of the parameters are defined either internally or externally.

At 104 of FIG. 3, the datastruct element is inserted into the body of a message. At 106, the message is sent from the originating entity to the destination entity via a network. In the exemplary object persister, the message may be sent over the Internet using the HTTP protocol.

At 108 and 110, the destination entity receives the message and parses it. At 112, the serialized object in the message is deserialized. The new object has the same hierarchical structure and arrangement of the original object (that was serialized). It also includes the data of that object at the moment that the object was serialized.

Exemplary Computing Environment

FIG. 4 illustrates an example of a suitable computing environment 920 on which the exemplary object persister may be implemented.

Exemplary computing environment 920 is only one example of a suitable computing environment and is not intended to suggest any limitation as to the scope of use or functionality of the exemplary object persister. Neither should the computing environment 920 be interpreted as having any dependency or requirement relating to any one or combination of components illustrated in the exemplary computing environment 920.

The exemplary object persister is operational with numerous other general purpose or special purpose computing system environments or configurations. Examples of well known computing systems, environments, and/or configurations that may be suitable for use with the exemplary object persister include, but are not limited to, personal computers, server computers, think clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary object persister may be described in the general context of computer-executable instructions, such as program modules, being executed by a computer. Generally, program modules include routines, programs, objects, components, data structures, etc. that perform particular tasks or implement particular abstract data types. The exemplary object persister may also be practiced in distributed computing environments where tasks are performed by remote processing devices that are linked through a communications network. In a distributed computing environment, program modules may be located in both local and remote computer storage media including memory storage devices.

As shown in FIG. 4, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) buss also known as Mezzanine bus.

Computer 930 typically includes a variety of computer readable media. Such media may be any available media that is accessible by computer 930, and it includes both volatile and non-volatile media, removable and non-removable media.

In FIG. 4, the system memory includes computer readable media in the form of volatile memory, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 4 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through an user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 4 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 network interface or adapter 986. When used in a WAN networking environment, the computer typically includes a modem 978 or other means for establishing communications over the WAN 979. The modem 978, which may be internal or external, may be connected to the system bus 936 via the user input interface 970, or other appropriate mechanism.

Depicted in FIG. 4, is a specific implementation of a WAN via the Internet. Over the Internet, computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 4 illustrates remote application programs 989 as residing on a memory device of remote computer 982. It will be appreciated that the network connections shown and described are exemplary and other means of establishing a communications link between the computers may be used.

Exemplary Operating Environment

FIG. 4 illustrates an example of a suitable operating environment 920 in which the exemplary object persister may be implemented. Specifically, the exemplary object persister is implemented by any program 960-962 or operating system 958 in FIG. 4.

The operating environment is only an example of a suitable operating environment and is not intended to suggest any limitation as to the scope of use of functionality of the bw-meter described herein. Other well known computing systems, environments, and/or configurations that may be suitable for use with the bw-meter include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Computer-Executable Instructions

An implementation of the exemplary object persister may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of the exemplary object persister may be stored on or transmitted across some form of computer readable media. Computer readable media can be any available media that can be accessed by a computer. By way of example, and not limitation, computer readable media may comprise computer storage media and communications media.

Computer storage media include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Communication media typically embodies computer readable instructions, data structures, program modules, or other data in a modulated data signal such as carrier wave or other transport mechanism and included any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the object persister has been described in language specific to structural features and/or methodological steps, it is to be understood that the object persister defined in the appended claims is not necessarily limited to the specific features or steps described. Rather, the specific features and steps are disclosed as preferred forms of implementing the claimed object persister.

The invention claimed is:

1. A method of serializing an object, the method comprising:
    generating an envelope relating to the object; generating a data structure ("datastruct") element embodied in one or more computer-readable media, the datastruct element being representative of a data structure of a first object, the datastruct element having a pair of datastruct tags, wherein the datastruct tags identify the datastruct element;
    generating contents of the datastruct element between the datastruct tags, the contents comprising one or more data parameter elements representative of one or more data parameters of the first object's data structure, each parameter element having a pair of parameter tags associated therewith, wherein each pair of parameter tags identifies a parameter element with which the pair of tags is associated, each parameter element having associated data between the pair of parameter tags;
    wherein the datastruct element and the contents are contained within the envelope.

2. A method as recited in claim 1, wherein the contents further comprise at least one object reference referencing a second object within the data structure of the first object without including the second object within the contents of the datastruct element.

3. A method as recited in claim 2, wherein the second object is the first object.

4. A method as recited in claim 1, wherein the contents comprises a datatype definition for at least one data parameter element.

5. A method as recited in claim 1, wherein the contents comprises a reference to a datatype definition for at least one data parameter element.

6. A method as recited in claim 1, wherein at least one of the pair of datastruct tags comprises a datatype definition for at least one data parameter element.

7. A method as recited in claim 1, wherein at least one of the pair of datastruct tags comprises a reference to a datatype definition for at least one data parameter element.

8. A method as recited in claim 1, wherein at least one of a pair of parameter tags comprises a datatype definition for associated data between the parameter tags.

9. A method as recited in claim 1, wherein at least one of a pair of parameter tags comprises a reference to a datatype definition for associated data between the parameter tags.

10. A method as recited in claim 1, wherein the datastruct element and its contents are encoded using XML.

11. A method as recited in claim 1 further comprising: inserting the datastruct element into a message; and sending the message to an entity on a network.

12. A method as recited in claim 11 further comprising: formatting the message for sending over a network using HTTP; sending the message to an entity on the network by using HTTP.

13. A method as recited in claim 11 further comprising: binding the message into a HTTP request; sending the message to an entity on the network by using HTTP.

14. A method as recited in claim 1, wherein a data parameter element has the following format: <parameter_label> parameter_data
    </parameter_label> the <parameter_label> being one of the pair of parameter tags, the </parameter_label> being the other of the pair of parameter tags, and the parameter_label identifying the data parameter element; the parameter_data being the data associated with the parameter element identified by the parameter_label.

15. A computer-readable storage medium having computer-executable instructions that, when executed by a computer, performs the method as recited in claim 1.

16. A method of serializing an object, the method comprising: generating a data structure ("datastruct") element embodied in one or more computer-readable media, the datastruct element being representative of a data structure of a first object, the datastruct element having a pair of datastruct tags, wherein the datastruct tags identify the datastruct element; generating contents of the datastruct element between the datastruct tags, the contents comprising one or more data parameter elements representative of one or more data parameters of the first object's data structure, each parameter element having a pair of parameter tags associated therewith, wherein each pair of parameter tags identifies a parameter element with which the pair of tags is associated, each parameter element having associated data between the pair of parameter tags; and, encoding a global attribute that indicates serialization rules utilized in the acts of generating.

17. A computer-readable storage medium having computer-executable instructions that, when executed by a computer, performs a method of formatting a message for exchange between entities on a network, the method comprising: generating an envelope relating to the object; generating a data structure ("datastruct") element embodied in one or more computer-readable media, the datastruct element being representative of a data structure of a first object, the datastruct element having a pair of datastruct tags, wherein the datastruct tags identify the datastruct element; generating contents of the datastruct element between the datastruct tags, the contents comprising one or more data parameter elements representative of one or more data parameters of the first object's data structure, each parameter element having a pair of parameter tags associated therewith, wherein each pair of parameter tags identifies a parameter element with which the pair of tags is associated, each parameter element having associated data between the pair of parameter tags; wherein the datastruct element and the contents are contained within the envelope.

18. An apparatus comprising: a processor; an object serializer executable on the processor to: generate a data structure ("datastruct") element representative of a data structure of a first object, the datastruct element having a pair of datastruct tags, wherein the datastruct tags identify the datastruct element; generate contents of the datastruct element between the datastruct tags, the contents comprising one or more data parameter elements representative of one or more data parameters of the first object's data structure, each parameter element having a pair of parameter tags associated therewith, wherein each pair of parameter tags identifies a parameter element with which the pair of tags is associated, each parameter element having associated data between the parameter tags; and, encode a global attribute that indicates serialization rules utilized in the acts of generating.

* * * * *